United States Patent
Almassy

(10) Patent No.: US 6,999,799 B1
(45) Date of Patent: Feb. 14, 2006

(54) SYSTEM AND METHOD FOR ADAPTIVE DEEP-SLEEP SLOTTED OPERATION

(75) Inventor: Nikolaus P. W. Almassy, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 824 days.

(21) Appl. No.: 09/672,535

(22) Filed: Sep. 28, 2000

(51) Int. Cl.
*H04Q 7/00* (2006.01)

(52) U.S. Cl. ....................... 455/574; 370/311
(58) Field of Classification Search .............. 455/574, 455/343, 422, 558, 572, 573, 576, 474; 340/7.32, 340/7.33, 7.35; 370/311
See application file for complete search history.

(56) References Cited

U.S. PATENT DOCUMENTS

| | | | |
|---|---|---|---|
| 5,301,225 A | 4/1994 | Suzuki et al. | |
| 5,392,287 A | 2/1995 | Tiedemann, Jr. et al. | 370/95.1 |
| 5,491,718 A | 2/1996 | Gould et al. | 375/205 |
| 5,570,369 A | 10/1996 | Jokinen | 370/95.3 |
| 5,590,396 A * | 12/1996 | Henry | 455/426 |
| 5,627,882 A * | 5/1997 | Chien et al. | 455/464 |
| 5,884,196 A | 3/1999 | Lekven et al. | 455/574 |
| 5,910,944 A | 6/1999 | Callicotte et al. | 370/311 |
| 6,041,241 A * | 3/2000 | Willey | 455/574 |
| 6,289,227 B1 * | 9/2001 | Shi | 455/574 |
| 6,501,969 B1 * | 12/2002 | Cannon et al. | 455/574 |
| 6,522,873 B1 * | 2/2003 | Moles et al. | 455/343 |

FOREIGN PATENT DOCUMENTS

| | | |
|---|---|---|
| EP | 0 711 089 A2 | 5/1996 |
| GB | 2 328 588 | 2/1999 |
| WO | WO 98/27769 | 6/1998 |
| WO | WO 00/22837 | 4/2000 |

\* cited by examiner

*Primary Examiner*—Nick Corsaro
(74) *Attorney, Agent, or Firm*—April M. Mosby; W. James Brady, III; Frederick J. Telecky, Jr.

(57) ABSTRACT

A system and method have been provided that permit a mobile station to enter a deep-sleep slotted mode of operation in response to detected patterns of low traffic communications. A record of traffic communications is maintained at either the mobile station, or in the wireless communications network. Analysis of the record indicates whether the mobile station should be operated in the deep-sleep mode. Then, the deep-sleep mode, with a larger period between control messages, is negotiated. In some aspects of the invention, the period between control messages is a function of the likelihood of a traffic communication occurring.

25 Claims, 4 Drawing Sheets

SYSTEM AND METHOD FOR ADAPTIVE DEEP-SLEEP SLOTTED OPERATION

BACKGROUND OF THE INVENTION

1. Field of the Invention

This invention relates generally to wireless telephone communications and, more particularly, to a system and method for tracking the daily traffic patterns to a wireless mobile station, and modifying the period of the slotted mode of operation, in response to the traffic pattern history.

2. Description of the Related Art

The following description of the related art comes primarily from the "Background of the Invention" Section of U.S. Pat. No. 5,491,718.

The pan-European digital cellular radio system which is in use in Europe (Groupe Speciale Mobile or GSM) implements a discontinuous reception (DRX), or "slotted paging mode", when operating in an idle mode. In this mode a radiotelephone, also referred to herein as a mobile station, does not continuously monitor a paging channel when in the idle mode. Instead, the mobile station is required to monitor the paging channel only during an assigned paging channel time slot. During all other paging channel time slots the mobile station can place itself into a low power mode of operation, such as by removing power from selected circuitry, thereby reducing power consumption and prolonging battery life.

A convenient method to make power consumption comparisons for the DRX mode employs the duty cycle or the radio of receiver on to off (sleep) time. The lower the duty cycle, the less time the mobile station is required to be powered on. A reduction in the on time, or conversely an increase in the off or sleep time, provides a reduction in power consumption and an increase in battery life.

In GSM, the idle mode is based on the concept of multiframes, each of which is 235 milliseconds (ms) long. The mobile station is required to read one paging message every two to nine multiframes (470 ms to 2.1 seconds), as specified by the base station. In addition, each paging message consists of four frames, where a frame is 4.614 ms in duration of 0.5769 ms. A mobile station is only required to receive on timeslot per frame. Therefore, the mobile station is required to receive only one paging message, of 18.46 ms (4×4.615 ms) duration, every 470 ms to 2.1 seconds. Of this 18.46 ms, the receiver circuitry is on for the minimum time, the duty cycle ranges from a maximum of 2.31 ms/470 ms=3.9% to a minimum of 18.46 ms/2.1 seconds=0.9%.

DRX has also been proposed to be implemented in the Japanese Digital Cellular (JDC) system. Although the U.S. digital cellular TDMA system (IS-54) does not, at present, implement a DRX mode, one is under consideration for the future, using the GSM and the proposed JDC systems as models.

In the proposed implementation of DRX in the JDC system, and similar to GSM the concept of superframes in used. Each superframe is 720 ms in duration, and consists of 36 frames of 20 ms each. The mobile station is required to read one paging message per superframe. Each frame in JDC consists of three timeslots, and the mobile station is required to receive only one timeslot of the three. In that a paging message consists of only one timeslot, of 20 ms/3=6.67 ms duration, the duty cycle in this proposed system is 6.67 ms/720 ms, or 0.93%.

As originally proposed for the US Code Division Multiple Access (CDMA) system, the mobile station must periodically receive one 200 ms slot, as determined by a SLOT_CYCLE_INDEX value. The index is selected by the mobile station, except that the base station can set the maximum index to correspond to as small as a one second cycle time. A typical, reasonable slot cycle for a mobile station is two seconds. Therefore, the duty cycle could be as low as 200 ms/$2^2$ seconds=10%, and as high as 200 ms/1 second=20%. Both of these duty cycle values are clearly significantly greater than the corresponding minimum and maximum values achievable with the GSM and the proposed JDC systems.

In addition, there exists a certain amount of overhead to receive a slotted page message. Because of continuous convolutional coding on the CDMA paging channel, the mobile station must receive at least a frame before and after the 200 ms slot, depending on the paging channel data rate. This time, in conjunction with various turn-on times in the mobile station receiver, results in a typical overhead of up to 100 ms. The total on-time of the mobile station thus becomes approximately 300 ms, resulting in a duty cycle between 20% and 30%, depending on the slot cycle length.

Furthermore, it is possible that the mobile station would be required to receive two paging channel slots. This can occur if the base station uses the MORE_PAGES bit in the SLOTTED PAGE MESSAGE, thereby requiring the mobile station to receive up to one additional slot. Also, the CDMA specification states that the mobile station may stop listening to the paging channel after reading the SLOTTED PAGE MESSAGE. There is no guarantee that this message is located at the beginning of the slot. As a result, it may happen that the mobile station must always listen to the entire slot.

As presently specified for use, a CDMA mobile station includes a system time pseudonoise (PN) generator, also referred to herein as a "short code" as opposed to "long code" generator. The system time short code PN generator has a rollover period of 26.67 milliseconds, and is aligned with the frame timing (20 milliseconds) every 80 milliseconds.

Another feature of the CDMA system is the use of a Long Code for mobile unit identification. The Long Code is a PN sequence with period $2^{42}-1$ that is used for scrambling on the Forward (base station to mobile) CDMA Channel and for spreading on the Reverse (mobile to base station) CDMA Channel. The Long Code uniquely identifies a mobile station on both the Forward and Reverse Traffic Channels. The Long Code also serves to provide limited privacy, and separates multiple Access Channels on the same CDMA channel. A Long Code Mask is a 42 bit binary number that creates the unique identity of the Long Code.

A problem is created when it is desired to periodically shutoff a long code generator, such as when powering down the mobile station when operating in the slotted paging (DRX) mode described above, and to then restart the long code generator in the proper state when powering back up. Since the long code generator is intended to run continuously, it is essential that the long code generator be initialized to the proper state whenever it is started after a period of non-operation.

One method has been proposed which would read the state of the long code generator just prior to powering down the mobile station. A complex matrix multiply operation is then applied to the long code to determine the correct state of the long code generator at a time in the future when the long code generator is to be reinitialized.

However, this approach is computationally expensive. As a result, it may be necessary to "wake UP" the mobile station earlier that would be necessary if the complex matrix multiply operation is performed after the power down period. If the matrix multiply is performed before powering down, then the mobile station must remain in a powered up state for a period of time sufficient to accomplish the matrix multiply. In either case, the mobile station is powered on for a longer time. The causes the overall duty cycle and power consumption to increase, thus decreasing battery life.

Other, more conceptually simple and power efficient methods of generating codes are available, as explained in Ser. No. 09/322,373, entitles METHOD AND APPARATUS FOR GENERATING DATA SEQUENCES FOR USE IN COMMUNICATIONS, invented by John McDonough, filed on May 28, 1999. Thus, the above-described code generation limitations do not necessarily prevent a CDMA mobile station from being able to operate with greater power efficiency in a slotted mode.

It would be advantageous if a battery operated mobile station could be operated in a deep-sleep mode of operation to converse battery power and to conserve network resources when it is likely that the mobile station is less likely to originate or receive a traffic channel communication.

SUMMARY OF THE INVENTION

Accordingly, a method that permits a mobile station telephone to be operated with specific "sleep times" is provided where the sleep times are a pre-specified, adaptive or externally controlled process of decreasing the number of control messages with the communicated with the wireless communications system. Conventional mobile stations operate in a slotted mode, where the paging channel is monitored only periodically for pages and network overhead messages. The present invention adaptive deep-sleep mode of operation calculates a variable slot interval, using calendar information that is generated by either the mobile station or the wireless system, based on usage history.

Specifically, the method for adaptively modifying the sleep-mode behavior of mobile stations comprises: maintaining a record of traffic communications to a mobile station; in response to the traffic communications record, determining cyclic patterns of traffic communication activity; and, reducing control communications with the wireless communications network during periods determined to have low traffic communication activity. Reducing control communications with the wireless system during periods determined to have low traffic communication activity means that the first mobile station operates in a deep-sleep slotted mode, where the mobile station monitors broadcast messages from the base station transmitted at a second periodic rate, slower than the first (conventional) rate.

Maintaining a record of communications includes making a record of traffic communications to the first mobile station over a period of time greater than a day. Then, determining cyclic patterns of traffic communication activity includes determining daily patterns of traffic communication activity by differentiating times within a daily cycle, and averaging the traffic communication activity occurring at the differentiated times. Further, traffic communication activity occurring in recent cycles is weighted more heavily than traffic communication activity occurring in less recent cycles.

In one aspect of the invention, the mobile station tracks the traffic communications and calculates the deep-sleep second period. Alternately, the base station, mobile switching center (MSC), or specialized node in the wireless system tracks the communications and calculates the second slotted mode rate. Either way, the use of the second slotted mode rate requires a request to the network that the mobile station be permitted to use the second rate. Then, the mobile station operates in the deep-sleep slotted mode at the second rate in response to receiving permission. Other details of the method are presented below in the detailed explanation of the invention.

A wireless communications system for adaptively modifying the sleep-mode behavior of mobile stations is also provided. The system comprises a mobile station communicating traffic and control communications with the wireless communications network. An interacting memory, microprocessor, and software application of machine executable instructions maintain a record of mobile station traffic communications and, in response to the traffic communications record, determine cyclic patterns of traffic communication activity. As above, control communications are variably reduced between the mobile station and the wireless communications network during periods determined to have low traffic communication activity. In some aspects of the invention, the memory, microprocessor, and software application reside with the mobile station. Alternately the memory, microprocessor, and software application reside with the wireless communications system.

DETAILED DESCRIPTION OF THE PREFERRED EMBODIMENTS

Figure 1:
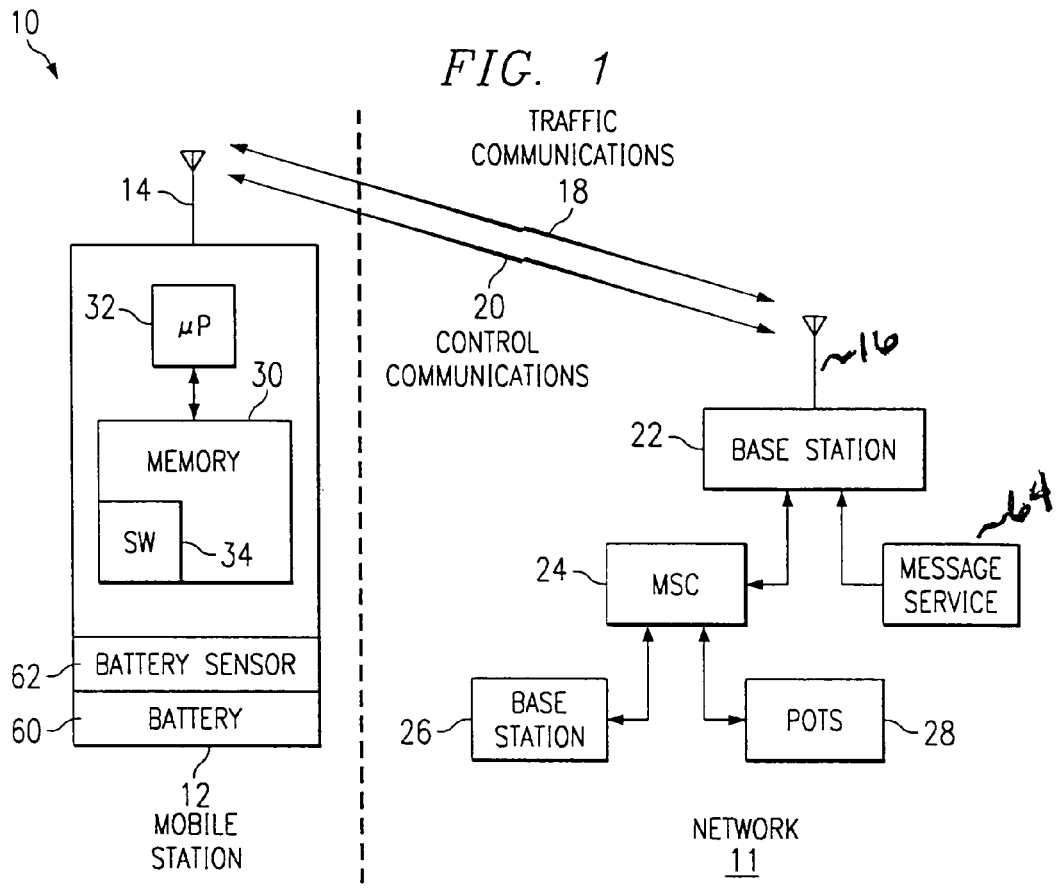
FIG. 1 is a schematic block diagram illustrating a system for adaptively modifying the sleep-mode behavior of mobile stations in a wireless communications network.

FIG. 1 is a schematic block diagram illustrating a system for adaptively modifying the sleep-mode behavior of a mobile station in a wireless communications network. The system 10 comprises a wireless communications network 11 and a mobile station 12 having a wireless communications port on line 14 to communicate traffic and control communications with the wireless communications network through antenna 16. The traffic and control communications are represented with reference designators 18 and 20, respectively. As is well understood, the wireless communications network 11 (to the right of the dotted line) may include a base station 22 in communication with the mobile station 12. In turn, the base station is connected to a mobile switching center 24, that communicates with other base stations, such as base station 26 to relay calls to other mobile stations (not shown), or to a POTS telephone system to relay calls to landline telephones (not shown).

An interacting memory 30, microprocessor 32, and software application of machine executable instructions 34 cooperate to maintain a record of mobile station traffic communications and, in response to the traffic communications record, determine cyclic patterns of traffic communication activity to and from mobile station 12. As shown in FIG. 1, the memory 30, microprocessor 32, and software application 34 are co-located with the mobile station 12 in some aspects of the invention. Alternate locations for these features are presented below.

The control communications 20 are reduced between the mobile station 12 and the wireless communications network 11 during periods determined to have low traffic communication activity. The control communications 20 transmitted from the base station 22 include broadcast messages monitored by the mobile station. The base station 22 decreases the frequency of transmitted broadcast messages when control communications 20 between the wireless communications network 11 and the mobile station 12 are reduced.

As explained in the background section, the control communications with the mobile station 12 can be understood in the context of message slots, and a slotted mode of operation. It is also understood that there may be an element of negotiation between the mobile station 12 and the base station 22 to establish a broadcast message monitoring and response pattern. Although not an absolute number, the mobile station 12 monitors broadcast messages from the base station transmitted at a first periodic rate in the conventional slotted mode of operation. However, the base station 22 control communications also include a deep-sleep slotted mode of operation to reduce control communications to the mobile station. In the deep-sleep slotted mode of operation the mobile station 12 monitors broadcast messages from the base station 22 at a second periodic rate, less than the first rate in the deep-sleep mode of operation.

Alternately stated, in the negotiations between the mobile station 12 and the base station 22, the mobile station 12 is able to convey the need for a reduced likelihood of use, which permits the base station to reduce the frequency of control communications.

To be effective and accurate, the traffic communications must be monitored over a period long enough period to establish patterns. The memory 30 maintains a record of communications which include a record of traffic communications to the first mobile station 12 over a period of time greater than a day. The software application 34 determines daily patterns of traffic communication activity from the stored record of traffic communications. The software application 34 cooperates with the record of traffic communications in memory 30 to differentiate times within a daily cycle, and to average the traffic communication activity occurring at the differentiated times. In some aspects of the invention, the software application 34 cooperates with the record of traffic communications stored in memory 30 to weight traffic communication activity occurring in recent cycles more heavily than traffic communication activity occurring in less recent cycles. Obviously, there are many different averaging algorithms that could be used to effectively average the data.

The software application 34 cooperates with the record of traffic communications stored in memory 30 to calculate the deep-sleep slotted mode second period. The base station 22 receives a request asking permission for the mobile station 12 to operate in deep-sleep slotted mode of operation having the second period. The base station must communicate with other mobile stations besides mobile station 12, and although a deep-sleep mode should free up network resources and reduce the communications noise floor, other elements in the network may not leave the base station free to grant the deep-sleep mode of operation request. Thus, the base station 22 may deny the request. Alternately, the base station will grant the request, or open negotiations for a compromise second period value, and the second period is a negotiated value.

Ultimately, the mobile station 12 receives a command from the base station 22 to operate in the deep-sleep mode of operation having the second period. The mobile station 12, then, acknowledges the request, and enters the deep-sleep slotted mode of operation.

Figure 2:
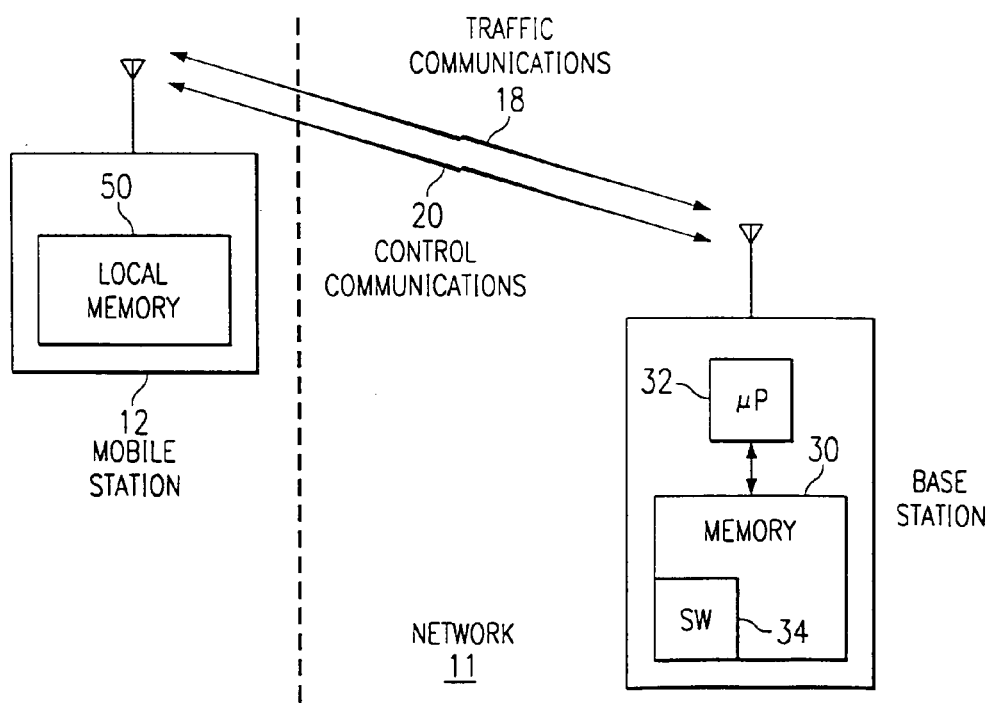
FIG. 2 is a schematic block diagram of the present invention system for adaptively modifying the sleep-mode behavior of mobile stations, where the decision elements are co-located with the base station.

FIG. 2 is a schematic block diagram of the present invention system for adaptively modifying the sleep-mode behavior of mobile stations, where the decision elements are co-located with the base station 22. That is, the memory 30, microprocessor 32, and software application 34 are co-located with the base station 22, and the patterns of traffic communication are determined at the base station 22. For simplicity, the memory 30, microprocessor 32, and software application are shown located in a single element, namely base station 22. As those skilled in the art can appreciate, these functions could also be performed at other levels in the wireless communications network, spread among multiple base stations, performed at the MSC (see FIG. 1), or performed by a special slotted mode calculation node (not shown) for all the mobile stations in the network 11.

In some aspects of the invention, the mobile station 12 includes a local memory 50 to maintain a record of traffic communication activities which are transmitted to the base station memory 30. Thus, the base station memory may be used to track recent events, while the long-term history is maintained in the mobile station local memory 50. Alternately, the mobile station local memory 50 may be used to track recent events, while the long-term history is maintained in the base station memory 30.

Regardless of whether the decision-making elements are located with the network 11 (FIG. 2), or with the mobile station 12 (FIG. 1), one feature of the inventive system is ability of the base station control communication 20 to operate in a variable deep-sleep slotted mode, to reduce control communications to the mobile station 12. Then, the mobile station 12 monitors broadcast messages from the base station 22 at a variable periodic rate, less than the first rate. The mobile station 12 monitors broadcast messages from the base station 22 at a variable periodic rate, in response to the average traffic communication activity occurring at a differentiated time in the cycle. Thus, a deeper sleep mode of operation is requested, with a slower second periodic rate, when it is calculated that the mobile station is extremely unlikely to engage in traffic communications. A less significant decrease in the slotted mode periodic rate is established when the likelihood of engaging in traffic communications is higher.

Returning to FIG. 1, in some aspects of the invention, the mobile station 12 includes a battery 60 and a battery condition detector 62. Then, the control communication 20 between the wireless communication network 11 and the mobile station 12 are reduced in response to the detected battery condition. That is, when the detected battery voltage or current is low, a reduced rate of control communications is requested, to minimize the load on the battery 60.

In some aspects of the invention, the base station 22 includes a message service 64, or the message service is a connected node (not shown) in the wireless communications network 11. When, the control communications are operated at a reduced rate, it takes longer to establish a traffic communication, since the time between pages is longer. A caller seeking to place a call during the set-up time may hear silence or multiple rings, and hang up in frustration. Therefore, the base station 22 sends a warning from the message center 64, following the reducing of the control communications with the mobile station 12, that the initiation of the traffic communication will be delayed, in response to the initiation of a mobile station traffic communication. For example, the warning may be a voice message stating that the call is being processed, but that the caller should expect a longer than normal time to establish the connection.

Figure 3:
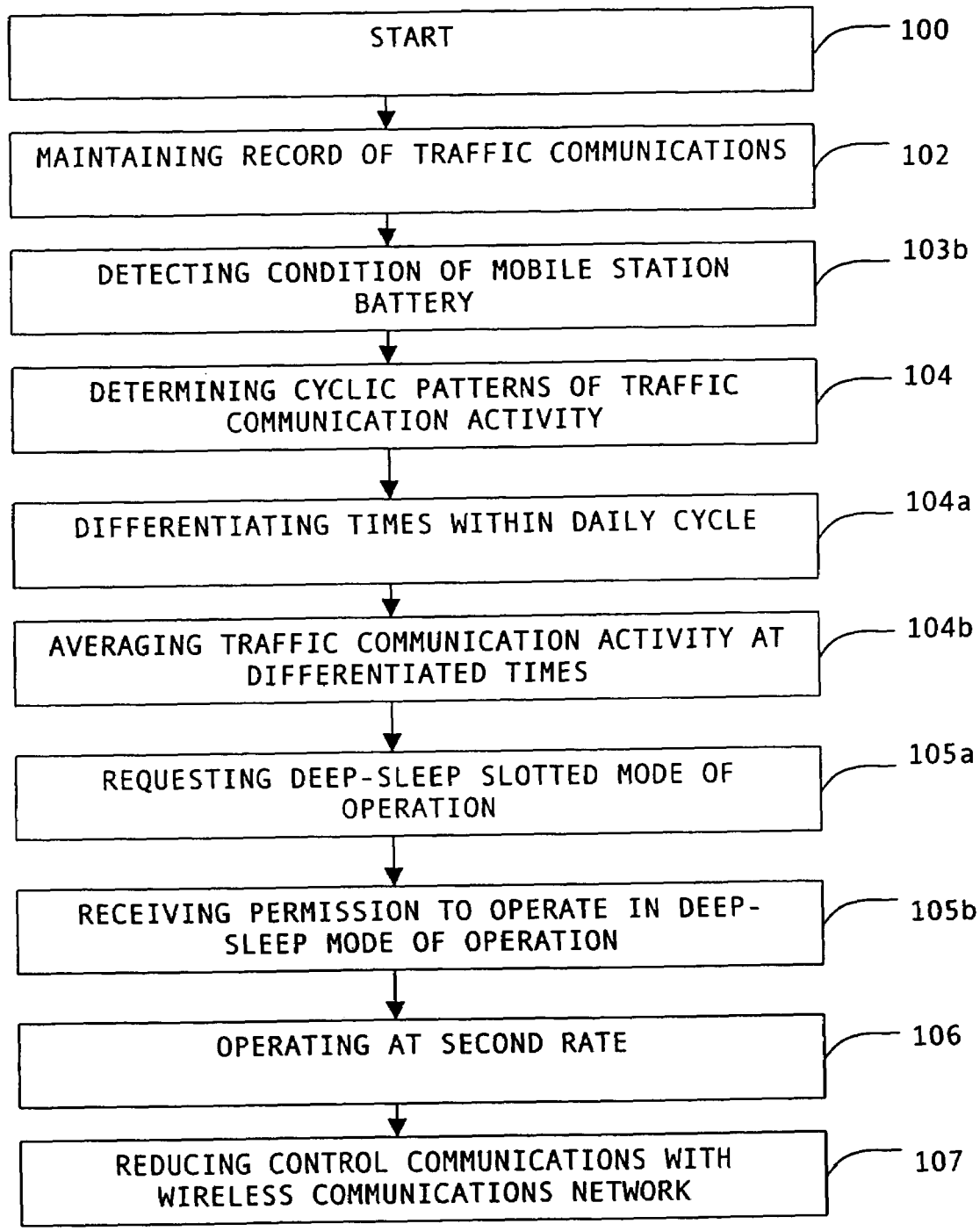
FIG. 3 is a flowchart illustrating a method for adaptively modifying the sleep-mode behavior of a mobile station in a wireless communications network.

FIG. 3 is a flowchart illustrating a method for adaptively modifying the sleep-mode behavior of a mobile station in a wireless communications network. Although the method is depicted as a sequence of numbered steps for clarity, no order should be inferred from the numbering unless explicitly stated. The method starts at Step 100. Step is 102 maintains a record of traffic communications to a mobile station. Step 104, in response to the traffic communications record, determines cyclic patterns of traffic communication activity. Step 106 reduces control communications with the wireless communications network during periods determined to have low traffic communication activity.

Typically, the wireless communications network includes a base station to transmit broadcast messages monitored by the mobile station. Then, reducing control communications with the wireless system during periods determined to have low traffic communication activity in Step 106 includes the first mobile station reducing the monitoring of base station broadcast messages. The control communications between the base station and the mobile station are typically organized in a slotted mode of operation where the mobile station monitors broadcast messages from the base station transmitted at a first periodic rate. Then, reducing control communications with the wireless system during periods determined to have low traffic communication activity in Step 106 includes the first mobile station operating in a deep-sleep slotted mode where the mobile station monitors broadcast messages from the base station transmitted at a second periodic rate, slower than the first rate.

In some aspects of the invention, maintaining a record of communications in Step 102 includes making a record of traffic communications to the first mobile station over a period of time greater than a day. Then, determining cyclic patterns of traffic communication activity in Step 104 includes determining daily patterns of traffic communication activity. In some aspects, determining cyclic patterns of traffic communication activity in Step 104 includes substeps. Step 104a differentiates times within a daily cycle, and Step 104b averages the traffic communication activity occurring at the differentiated times.

Typically, determining cyclic patterns of traffic communication activity in Step 104 includes weighting traffic communication activity occurring in recent cycles more heavily than traffic communication activity occurring in less recent cycles.

Further, determining cyclic patterns of traffic communication activity in Step 104 includes calculating the deep-sleep slotted mode second period. Then, the method includes further steps. Step 105a requests from the base station, a deep-sleep slotted mode of operation having the second period. Step 105b receives permission to operate in the deep-sleep mode of operation having the second period. Then, operating in a deep-sleep slotted mode at the second rate in Step 106 includes operating at the second rate in response to receiving permission.

In one aspect of the invention, the mobile station includes a memory, a microprocessor, and a stored software application of machine executable instructions. Then, maintaining a record of traffic communication activities in Step 102 includes monitoring and storing a traffic communications record in the memory of the mobile station. Determining the patterns of traffic communication activity in Step 104 includes using the software application to access the record stored in memory to calculate patterns of traffic communication activity and the deep-sleep mode second rate.

Figure 4:
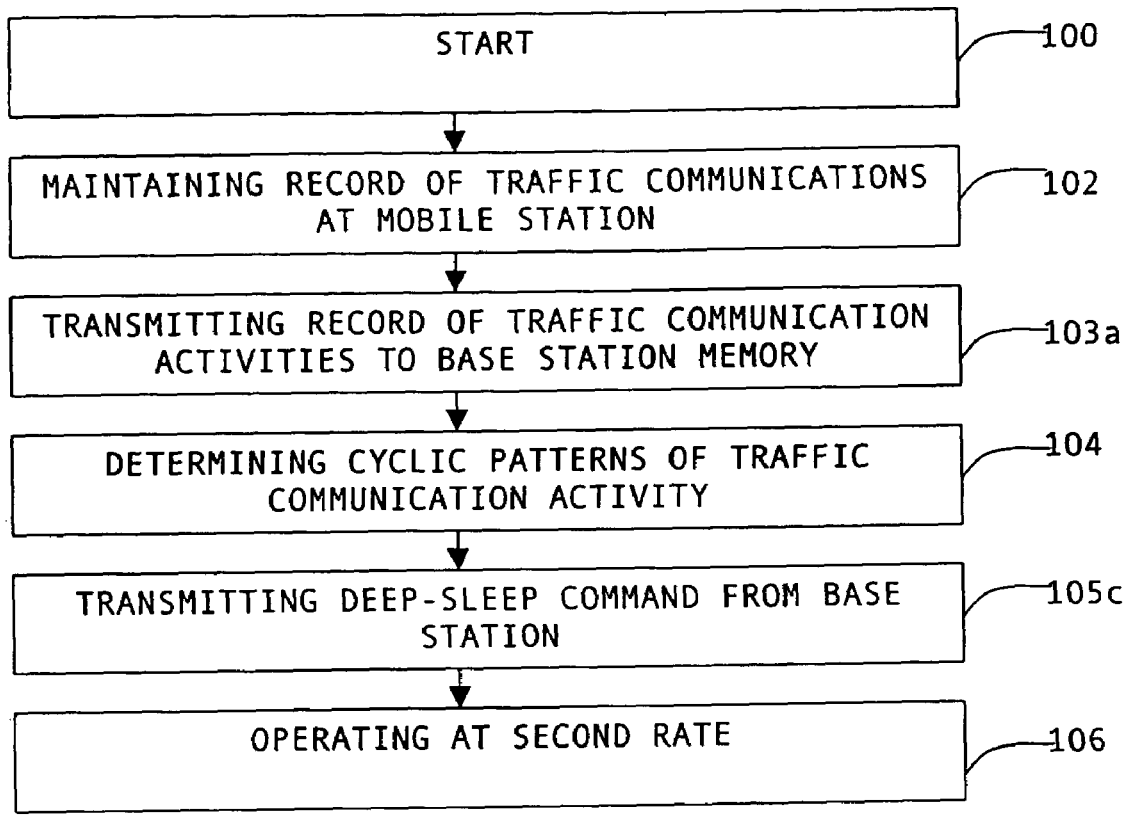
FIG. 4 illustrates an alternate aspect of the invention of FIG. 3, where the mobile station includes a memory, and the base station includes a memory, a microprocessor, and a software application of machine executable instructions.

FIG. 4 illustrates an alternate aspect of the invention of FIG. 3, where the mobile station includes a memory, and the base station includes a memory, a microprocessor, and a software application of machine executable instructions. Then, maintaining a record of traffic communication activities in Step 102 includes monitoring and storing a traffic communications record in the memory of the mobile station. The method further comprises Step 103a, transmitting the record of traffic communication activities to the base station memory. Determining the patterns of traffic communication activity in Step 104 then includes using the base station software application to access the record stored in the base station memory, to calculate patterns of traffic communication activity and the deep-sleep mode second rate.

In Step 105c the base station transmits a command for the mobile station to operate in the deep-sleep slotted mode of operation having the second period. Operating in a deep-sleep slotted mode at the second rate in Step 106 includes the mobile station operating at the second rate in response to receiving the command.

Figure 5:
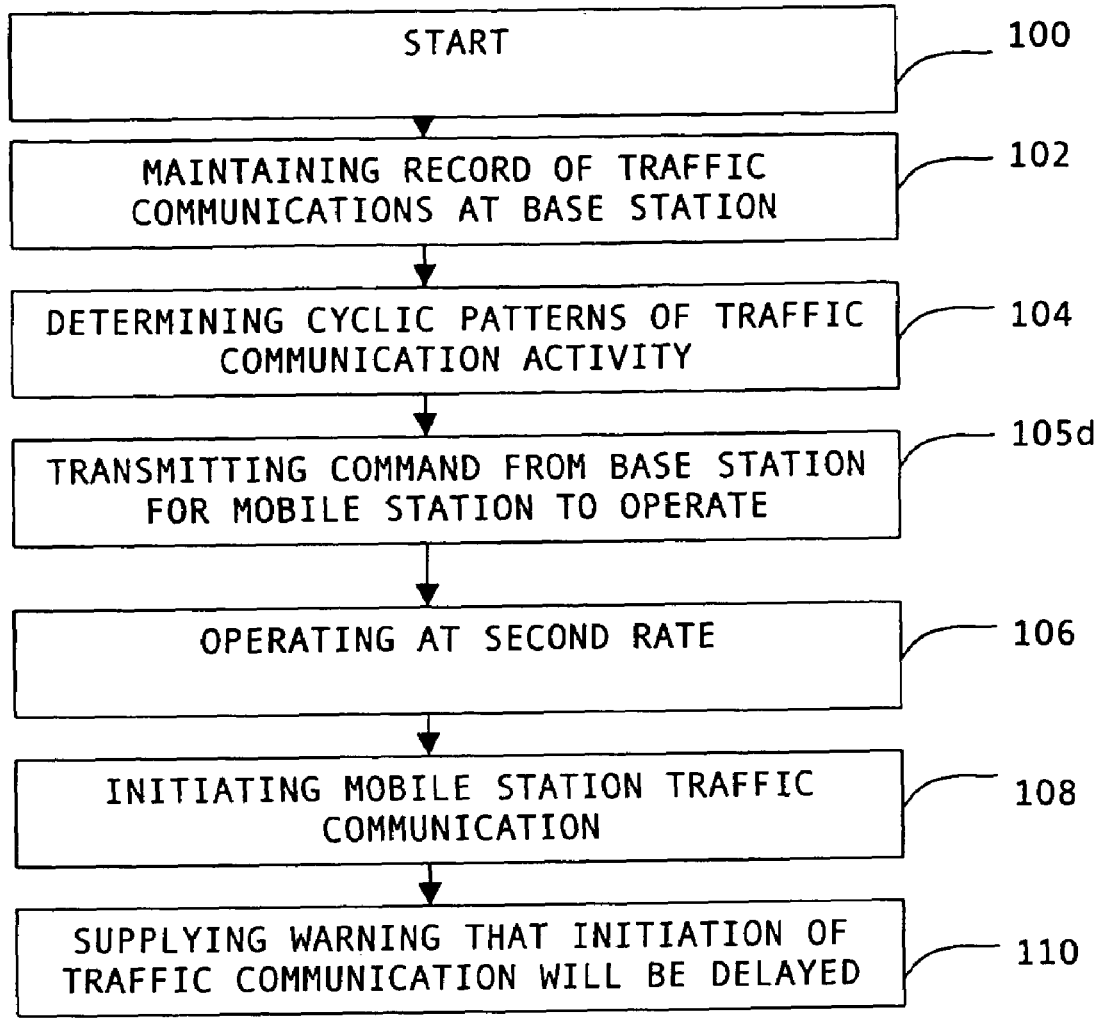
FIG. 5 illustrates an alternate aspect of the invention of FIG. 3, where the base station includes a memory, a microprocessor, and a software application of machine executable instructions.

FIG. 5 illustrates an alternate aspect of the invention of FIG. 3, where the base station includes a memory, a microprocessor, and a software application of machine executable instructions. Maintaining a record of traffic communication activities in Step 102 includes monitoring and storing a traffic communications record in the memory of the base station. Determining the patterns of traffic communication activity in Step 104 includes using the base station software application to access the record stored in memory to calculate patterns of traffic communication activity and the deep-sleep mode second rate.

In Step 105d the base station transmits a command for the mobile station to operate in the deep-sleep slotted mode of operation having the second period. Operating in a deep-sleep slotted mode at the second rate in Step 106 includes the mobile station operating at the second rate in response to receiving the command.

Equally applicable to FIGS. 3, 4, and 5, in some aspects invention reducing control communications with the wireless system during periods determined to have low traffic communication activity in Step 106 includes the first mobile station operating in a deep-sleep slotted mode where the mobile station monitors broadcast messages from the base station transmitted at a second, variable, periodic rate, slower than the first rate. Further, Step 106 includes the second rate at which the deep-sleep mode being varied in response to the average traffic communication activity occurring at a differentiated time in the cycle.

In some aspects of the invention the mobile station includes a battery. Then, Step 103b (as represented in FIG. 3) detects the condition of the mobile station battery. Step 107 reduces control communications with the wireless communications network in response to the condition of the mobile station battery.

In another aspect of the invention, a base station message service is included. Then, the method comprises a further step. Step 108, following the reducing of the control communications with the wireless communications network, initiates a mobile station traffic communication. Then, Step 110 supplies a warning from the base station message service that the initiation of the traffic communication with the mobile station will be delayed.

A system and method of reducing control communications between a wireless communications network and a mobile station have been provided. Example have been given for reducing the control communications in response to factors such as traffic communications and battery power. Other reasons to reduce, or otherwise modify, the rate of control communications also exist, such as the density of mobile stations operating in a cell. Other embodiments and variations of the invention will occur to those skilled in the art.

I claim:

1. In a wireless communication network, a method for adaptively modifying the sleep-mode behavior of a mobile station, wherein the wireless communications network includes control communications and a base station to transmit broadcast messages monitored by the mobile station, the method comprising:

maintaining a record of traffic communications to the mobile station by making a record of traffic communications to the mobile station over a period of time greater than a day;

determining cyclic patterns of traffic communication activity, in response to the traffic communications record by determining daily patterns of traffic communication activity; and reducing control communications with the wireless communications network during periods determined to have low traffic communication activity, wherein the control communications between the base station and the mobile station include a slotted mode of operation where the mobile station monitors broadcast messages transmitted at a first periodic rate and, after control communications have been reduced, the mobile station monitors broadcast messages transmitted at a second periodic rate, slower than the first rate.

2. The method of claim 1 wherein determining cyclic patterns of traffic communication activity includes:

differentiating times within a daily cycle; and averaging the traffic communication activity occurring at the differentiated times.

3. The method of claim 2 wherein determining cyclic patterns of traffic communication activity includes:

weighting traffic communication activity occurring in recent cycles more heavily than traffic communication activity occurring in less recent cycles.

4. The method of claim 2 wherein determining cyclic patterns of traffic communication activity includes calculating the deep-sleep slotted mode second period; and the method further comprising:

requesting from the base station, a deep-sleep slotted mode of operation having the second period;

receiving permission to operate in the deep-sleep mode of operation having the second period; and wherein operating in a deep-sleep slotted mode at the second rate includes operating at the second rate in response to receiving permission.

5. The method of claim 4 in which the mobile station includes a memory, a microprocessor, and a stored software application of machine executable instructions; and wherein maintaining a record of traffic communication activities includes monitoring and storing a traffic communications record in the memory of the mobile station; and wherein determining the patterns of traffic communication activity includes using the software application to access the record stored in memory to calculate patterns of traffic communication activity and the deep-sleep mode second rate.

6. The method of claim 3 in which the mobile station includes a memory and in which the base station includes a memory, a microprocessor, and a software application of machine executable instructions;

wherein maintaining a record of traffic communication activities includes monitoring and storing a traffic communications record in the memory of the mobile station; and the method further comprising:

transmitting the record of traffic communication activities to the base station memory; and wherein determining the patterns of traffic communication activity includes using the base station software application to access the record stored in the base station memory to calculate patterns of traffic communication activity and the deep-sleep mode second rate.

7. The method of claim 6 further comprising:

the base station transmitting a command for the mobile station to operate in the deep-sleep slotted mode of operation having the second period; and wherein operating in a deep-sleep slotted mode at the second rate includes the mobile station operating at the second rate in response to receiving the command.

8. The method of claim 3 in which the base station includes a memory, a microprocessor, and a software application of machine executable instructions;

wherein maintaining a record of traffic communication activities includes monitoring and storing a traffic communications record in the memory of the base station; and wherein determining the patterns of traffic communication activity includes using the base station software application to access the record stored in memory to calculate patterns of traffic communication activity and the deep-sleep mode second rate.

9. The method of claim 8 further comprising:

the base station transmitting a command for the mobile station to operate in the deep-sleep slotted mode of operation having the second period; and wherein operating in a deep-sleep slotted mode at the second rate includes the mobile station operating at the second rate in response to receiving the command.

10. The method of claim 3 wherein reducing control communications with the wireless communications network during periods determined to have low traffic communication activity includes the first mobile station operating in a deep-sleep slotted mode where the mobile station monitors broadcast messages from the base station transmitted at a second, variable, periodic rate, slower than the first rate.

11. The method of claim 10 wherein the second rate at which the deep-sleep mode operates is varied in response to the average traffic communication activity occurring at a differentiated time in the cycle.

12. In a wireless communication networks, a method for adaptively modifying the sleep-mode behavior of a mobile station, wherein the wireless communications network includes a base station to transmit broadcast messages monitored by the mobile station, the method comprising:

maintaining a record of traffic communications to a mobile station;

determining cyclic patterns of traffic communication activity, in response to the traffic communications record;

reducing control communications with the wireless communications network during periods determined to have low traffic communication activity, initiating a mobile station traffic communication;

supplying a warning from the base station message service that the initiation of the traffic communication with the mobile station will be delayed.

13. In a wireless communications network, a system for adaptively modifying the sleep-mode behavior of a mobile station, the system comprising:

a mobile station having a wireless communications port to communicate traffic and control communications with the wireless communications network;

an interacting memory, microprocessor, and software application of machine executable instructions to maintain a record of mobile station traffic communications and, in response to the traffic communications record, determining cyclic patterns of traffic communication activity, wherein control communications are reduced between the mobile station and the wireless communications network during periods determined to have low traffic communication activity; and a base station to transmit broadcast messages monitored by the mobile station, the base station decreasing the frequency of transmitted broadcast messages when control communications between the wireless communications network and the mobile station are reduced.

14. The system of claim 13 wherein base station control communication to the mobile station include a slotted mode of operation;

wherein the mobile station monitors broadcast messages from the base station transmitted at a first periodic rate in the slotted mode of operation;

wherein the base station control communications include a deep-sleep slotted mode of operation to reduce control communications to the mobile station; and wherein the mobile station monitors broadcast messages from the base station at a second periodic rate, less than the first rate in the deep-sleep mode of operation.

15. The system of claim 14 wherein the memory maintains a record of communications which include a record of traffic communications to the mobile station over a period of time greater than a day; and wherein the software application determines daily patterns of traffic communication activity from the stored record of traffic communications.

16. The system of claim 15 wherein the software application cooperates with the record of traffic communications in memory to differentiating times within a daily cycle and to average the traffic communication activity occurring at the differentiated times.

17. The system of claim 16 wherein the software application cooperates with the record of traffic communications stored in memory to weight traffic communication activity occurring in recent cycles more heavily than traffic communication activity occurring in less recent cycles.

18. The system of claim 16 wherein the software application cooperates with the record of traffic communications stored in memory to calculate the deep-sleep slotted mode second period; and wherein the base station receives a request asking permission for the mobile station to operate in deep-sleep slotted mode of operation having the second period;

wherein the mobile station receives a command from the base station to operate in the deep-sleep mode of operation having the second period.

19. The system of claim 18 wherein the memory, microprocessor, and software application are co-located with the mobile station, and wherein the patterns of traffic communication are determined at the mobile station.

20. The system of claim 17 wherein the memory, microprocessor, and software application are co-located with the base station, and wherein the base station determines the patterns of traffic communication activity.

21. The system of claim 20 wherein the mobile station includes a local memory to maintain a record of traffic communication activities which are transmitted to the base station memory.

22. The system of claim 14 wherein the base station control communications include a variable deep-sleep slotted mode of operation to reduce control communications to the mobile station; and wherein the mobile station monitors broadcast messages from the base station at a variable periodic rate, less than the first rate in the variable deep-sleep mode of operation.

23. The system of claim 22 wherein the mobile station monitors broadcast messages from the base station at a variable periodic rate, in response to the average traffic communication activity occurring at a differentiated time in the cycle.

24. The system of claim 13 wherein the mobile station includes a battery and a battery condition detector, and wherein control communications between the wireless communication network and the mobile station are reduced in response to the detected battery condition.

25. The system of claim 13 in which a base station includes a message service; and wherein the base station, following the reducing of the control communications with the mobile station, and in response to the initiation of a mobile station traffic communication, sends a warning from the message center that the initiation of the traffic communication will be delayed.

* * * * *